(12) United States Patent
Smith et al.

(10) Patent No.: US 11,747,429 B2
(45) Date of Patent: Sep. 5, 2023

(54) DIFFERENTIAL MATCHED SUMMED POSITIONING

(71) Applicant: TELEFONAKTIEBOLAGET LM ERICSSON (PUBL), Stockholm (SE)

(72) Inventors: Roland Smith, Nepean (CA); Miguel Berg, Sollentuna (SE); Satyam Dwivedi, Solna (SE); Mike Skof, Nepean (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 224 days.

(21) Appl. No.: 17/295,197

(22) PCT Filed: Dec. 13, 2019

(86) PCT No.: PCT/IB2019/060791
§ 371 (c)(1),
(2) Date: May 19, 2021

(87) PCT Pub. No.: WO2020/128760
PCT Pub. Date: Jun. 25, 2020

(65) Prior Publication Data
US 2022/0011394 A1 Jan. 13, 2022

Related U.S. Application Data

(60) Provisional application No. 62/782,086, filed on Dec. 19, 2018.

(51) Int. Cl.
*H04W 24/00* (2009.01)
*G01S 5/02* (2010.01)
(Continued)

(52) U.S. Cl.
CPC .............. *G01S 5/0218* (2020.05); *G01S 5/06* (2013.01); *H04L 5/0051* (2013.01);
(Continued)

(58) Field of Classification Search
CPC ....... G01S 5/0218; G01S 5/06; H04L 5/0051; H04L 25/0206; H04W 64/003
See application file for complete search history.

(56) References Cited

U.S. PATENT DOCUMENTS 6,121,927 A * 9/2000 Kalliojarvi ................ G01S 3/46
342/453
2014/0106774 A1 4/2014 Siomina et al.
(Continued)

OTHER PUBLICATIONS

ISR and WO for PCT/IB2019/060791.
(Continued)

*Primary Examiner* — Justin Y Lee
(74) *Attorney, Agent, or Firm* — SAGE PATENT GROUP

(57) ABSTRACT

A method and network node for differential matched summed antenna positioning are disclosed. According to one aspect, a method includes summing sequential uplink data signals at each of a plurality of antennas of the network node
(Continued)

to produce a plurality of antenna signal sums. The method also includes selecting one of the antenna signal sums to be used as a reference antenna signal sum. A channel impulse response is determined for each of a plurality of other antennas by cross correlating the reference antenna signal sum with the others of the plurality of antenna signal sums. The method further includes estimating a time difference of arrival from the channel impulse responses of the plurality of antennas, and estimating an error of the estimated time difference of arrival of each antenna. A position of a wireless device is determined using the estimated time differences of arrival.

28 Claims, 13 Drawing Sheets

(51) Int. Cl.
  *G01S 5/06* (2006.01)
  *H04L 5/00* (2006.01)
  *H04L 25/02* (2006.01)
  *H04W 64/00* (2009.01)
(52) U.S. Cl.
  CPC ....... *H04L 25/0206* (2013.01); *H04W 64/003* (2013.01); *G01S 2205/01* (2020.05)

(56) References Cited

U.S. PATENT DOCUMENTS

| | | | | |
|---|---|---|---|---|
| 2014/0295877 | A1* | 10/2014 | Hart | H04W 4/06 |
| | | | | 455/456.1 |
| 2016/0306027 | A1* | 10/2016 | Chrabieh | G01S 5/06 |
| 2017/0026798 | A1* | 1/2017 | Prevatt | H04W 4/023 |
| 2017/0288897 | A1 | 10/2017 | You et al. | |

OTHER PUBLICATIONS

Ericsson: "RAT dependent NR positioning solutions", 3GPP DRAFT; R1-1813592 RAT Dependent NR Positioning Solutions, 3rd Generation Partnership Project (3GPP), Mobile Co, vol. RAN WGI, No. Spokane, United States; Nov. 12, 2018-Nov. 16, 2018 Nov. 11, 2018MPETENCE Centre ; 650, Route Des Lucioles ; F-06921 Sophia-Antipolis Cedex ; FRANC.
Nortel et al.: "Simulated UTDOA Performance with LMUs", 3GPP DRAFT; RI-094636, 3rd Generation Partnership Project (3GPP), Mobile Competence Centre ; 650, Route Des Lucioles ; F-06921 Sophia-Antipolis Cedex ; France, no. Jeju; Nov. 9, 2009, Nov. 9, 2009 (Nov. 9, 2009), XP050389042, [retrieved on Nov. 13, 2009].
Trueposition: "Results for UTDOA positioning simulations", 3GPP DRAFT; R1-092998 UTDOA Simulations, 3rd Generation Partnership . Project (3GPP), Mobile Competence Centre; 650, Route Des Lucioles, F-06921 Sophia-Antipolis Cedex, France no. Shenzhen, China; Aug. 18, 2009, Aug. 18, 2009 (Aug. 18, 2009), XP050351404,[retrieved on Aug. 18, 2009], pp. 1-2.

\* cited by examiner

DIFFERENTIAL MATCHED SUMMED POSITIONING

CROSS REFERENCE TO RELATED APPLICATIONS

This application is a 35 U.S.C. § 371 national phase filing of International Application No. PCT/IB2019/060791, filed Dec. 13, 2019, the content of which is incorporated herein by reference in its entirety.

TECHNICAL FIELD

The present disclosure relates to wireless communications, and in particular to differential matched summed antenna positioning.

BACKGROUND

The evolution of Fourth Generation (4G) to Fifth Generation (5G) wireless communication networking has introduced significant complexities in the radio access network (RAN) architecture, with functionality moving from baseband processing elements into the advanced antenna system (AAS) radio unit (RU), where operations such as controlling beam-forming, or beam-summing of co-located or distributed antennas are performed. This split moves higher layer baseband components into 'Cloud' processors.

This architectural evolution also moves lower physical (PHY) layer operations into the RU, and upper PHY/ medium access control (MAC) functions such as Third Generation Partnership Project (3GPP) scheduling and frame generation into the Cloud. "In the Cloud" as used herein means located remotely and accessible via the Internet. Connectivity between RU and the Cloud is restricted to relatively low bit rate of tens of Gigabits per second (Gbps) compared to what would have been hundreds of Gbps for a distributed beam-summing solution with 16 antennas, or a co-located beam-forming solution of 256 antennas This evolution has also introduced new ways of processing data for positioning calculations, by making simplifications in measuring relative timing and power from attached devices located within a base station (e.g., gNodeB) coverage zone, and visible to the many distributed or co-located antenna elements.

Current 3GPP positioning solutions for 4G networks leverage observed time difference of arrival (OTDoA) wireless device reference signal time difference (RSTD) calculations, with significant centralized coordination of eNodeB resources to make the time difference of arrival (TDoA) measurements used for high precision positioning. The current 5G 'lean carrier' view does not include positioning reference signals (PRS) used by wireless devices (WDs) to make these measurements.

In short, 3GPP 5G has not yet defined a viable network-based positioning technology for gNodeBs to make high precision positioning WD measurements for narrow band Internet of things (NB-IoT), CAT-M1, sub 6 Giga Hertz (GHz) New Radio (NR), or millimeter wave NR devices, all of which are connected to a co-located beam-formed or distributed beam-summed gNodeB. WDs supporting 5G non-stand-alone (NSA) protocol can fall back to legacy 4G techniques, such as OTDoA, but with the absence of PRS in NR radios, advanced positioning techniques are not possible.

Positioning features employing Cell-Identity (CID), Enhanced Cell Identity (E-CID), or Adaptive Enhanced Cell Identity (AE-CID) are available, but none meet 5G targets of <1 meter for many of these connected devices.

A 5G specific method is required which meets the 'lean-carrier' requirement while achieving a significant improvement in positioning accuracy for centralized beam-formed, or distributed beam-summed systems There are no existing high precision lean carrier solutions for 3GPP 5G/NR positioning. Current 3GPP 4G algorithms employ non-lean carrier methods of repeated PRS measurements relying on lengthy averaging for improved sensitivity, while still not achieving 5G targeted accuracy of sub 1 meter.

For 4G networks, precision time measurements are described in ETSI Technical Specification "ETSI TS 136 133 V12.18.0 (2018 January) LTE; Evolved Universal Terrestrial Radio Access (E-UTRA); Requirements for support of radio resource management (3GPP TS 36.133 version 12.18.0 Release 12)." Table 9.1.10.1-1: "RSTD Measurement Accuracy" details Reference Signal Time Difference (RSTD) for intra-frequency and inter-frequency measurements for various categories of Long Term Evolution (LTE) signals, from Cat M1 (6 resource block (RB)) signals equal to 1.08 Mega Hertz (MHz) to wider bandwidths 75 RBs or 15 MHz. In these cases, RSTD, which is calculated by the WD by comparing Positioning Reference Signals, achieves accuracies less than ±15 Ts for 6 RB signals to ±4 Ts for 75 RB signals. Ts is the basic timing unit defined in 3GPP Technical Standard TS 36.211 and is equal to $1/(15000\times 2048)$ seconds. This can be approximated as 32.5 nanoseconds (ns), representing one cycle of a 30.72 MHz sampling rate. An error of ±1 Ts translates into a positional error of ±10 m for a radio frequency speed of 300 m/μs equivalent to 3.33 ns/m and an error of ±20 Ts translates into a positioning error of ±200 m.

In 5G networks, precision time measurements are not described in the equivalent ETSI Technical Specification "ETSI TS 138 331 V15.2.1 (2018 June) 5G; NR; Radio Resource Control (RRC); Protocol specification (3GPP TS 38.331 version 15.2.1 Release 15)". There are several rationales for this omission:

PRS signals are not considered "lean" in that they add a fixed overhead on all gNodeB transmissions;

PRS based OTDoA RSTD accuracy has not lived up to accuracy expectations, and have found only minimal use for E911, as other solutions such as AE-CID provide comparable or better accuracies; and PRS based OTDoA RSTD cannot be used for the broad suite of Location Based Services demanded of the 5G network. These measurements are not supported by many smart phone manufacturers, except under E911 call conditions, as mandated by regulations.

The current 5G standard is therefore without a network-based time of arrival positioning solution which would treat all WDs equally. 4G PRS based solutions based on PRS RSTD measurements have not met accuracy expectations and are not likely to be reintroduced, further hampered by low WD compliance levels.

While adaptive enhanced cell identity (AE-CID) solutions have made significant progress, such techniques are impacted by environmental factors, such as seasonal foliage changes, or effects of rain on signal propagation. Detailed datasets can address these factors but must be periodically updated to account for changes from new constructions in the defined coverage areas.

Today's 4G positioning solutions have measurement accuracy for Cat M1 WDs of ±15 Ts for intra-frequency, and ±20 Ts for inter-frequency, and Cat NB1 WDs of ±21 Ts for intra-frequency, and ±28 Ts for inter-frequency, for "normal coverage" relaxed for "extended coverage" to ±32 Ts for intra-frequency, and ±40 Ts for inter-frequency operation. Higher bandwidth 4G signals of 15 RBs, 25 RBs, 50 RBs, and 75 RBs have measurements accuracies of ±10 Ts; ±6 Ts; ±5 Ts; and ±4 Ts for an accuracy of ±100 m; ±60 m; ±50 m; and ±40 m respectively.

These errors are large and show that RSTD measurements do not meet the requirements of Internet of things (IoT) and 5G positioning detailed in various publications which describe 5G use case location accuracy requirements by industry categories such as, for example:

Automotive, <1 meter
Transport, logistics, IoT, <1 meter
Health and wellness, smart cities, <10 meter
Media and entertainment, <1 meter These publications do not describe the methodology to achieve these accuracies, rather they simply set out requirements for different vertical applications. European Telecommunications Standards Institute (ETSI) Technical Standard (TS) 22 261 furthers elaborates on these vertical applications with a description in section 7.3 of "Higher-Accuracy Positioning" characterized by "ambitious system requirements for positioning accuracy" which states:

"A typical area where "higher-accuracy positioning" is needed is collision avoidance of vehicles: every vehicle must be aware of its own position, the positions of near-by vehicles, and their expected paths, to avoid collisions. On the factory floor, it is important to locate moving objects such as forklifts, or parts to be assembled."

While WDs may use various techniques of averaging and interpolation to improve measurement results, their slow sampling rate limits their overall accuracy.

Positioning signals today are not directly related to the delivery of user data. Current 3GPP standards for 5G/NR positioning do not support time of arrival measurement capabilities for WD positioning. Legacy 3GPP 4G algorithms employ non-lean carrier methods of repeated PRS measurements relying on lengthy averaging for improved sensitivity, while still not achieving 5G targeted accuracy of sub 1 m.

SUMMARY

An aspect of the present disclosure describes a network node configured to communicate with a wireless device (WD). The network node comprises: at least one processor; and a memory including computer readable software instructions configured to control the at least one processor to implement steps of: summing sequential uplink data signals at each of a plurality of antennas of the network node to produce a plurality of antenna signal sums; selecting one of the antenna signal sums to be used as a reference antenna signal sum; determining a channel impulse response for each of a plurality of other antennas based on the reference antenna signal sum and the others of the plurality of antenna signal sums; estimating a time difference of arrival from the channel impulse responses of the plurality of antennas; estimating an error of the estimated time difference of arrival of each antenna; and calculating a position of a wireless device using the estimated time differences of arrival.

In some embodiments, determining the channel impulse response for each of the plurality of other antennas comprises cross correlating the reference antenna signal sum with the others of the plurality of antenna signal sums, and wherein from the channel impulse responses of the plurality of antennas.

In some embodiments, determining the channel impulse response for each of the plurality of other antennas comprises multiplying, in the frequency domain, the complex conjugate of the reference antenna signal sum by each of the antenna signal sums of others of the plurality of antennas, and wherein the time difference of arrival is estimated as the time domain representation of the product of the multiplying.

In some embodiments, the summing of sequential uplink data signals is calculated as the sum of orthogonal frequency division multiplex, OFDM, symbols received at an antenna.

In some embodiments, a reference antenna is selected from the plurality of antennas as the antenna having a signal to noise ratio, SNR, of at least 10 dB.

In some embodiments, a plurality of channel impulse responses are calculated from a subset of symbols and summing is performed on channel impulse responses.

In some embodiments, the calculated channel impulse response is bounded in a time domain by a channel impulse response of a demodulation reference signal, DMRS, symbol from at least one of the plurality of antenna signals.

In some embodiments, a time-based linear quadratic estimation algorithm is employed to minimize statistical noise on the time difference of arrival calculations.

In some embodiments, the channel impulse response is calculated as a plurality of antenna signal sums of reference symbols cross correlated with a reference antenna sum of reference symbols.

In some embodiments, the estimation of time differences of arrival are based on knowledge that orthogonal frequency division multiplex, OFDM, symbol timing is free of jitter.

In some embodiments, the antenna signal sums are integrated over a duration of one of 50 ms, 500 ms and 5000 ms.

In some embodiments, the network node is configured to use Uplink Resource Allocation Type 0 to have a minimum uplink grant window size of 16 resource blocks and is configured to grant at least two uplink grant windows to a wireless device to ensure that an uplink signal bandwidth is at least 32 resource blocks wide regardless of wireless device buffer status report indications.

In some embodiments, the network node is configured to use Uplink Resource Allocation Type 1, with no minimum uplink grant window size and is configured to grant a virtual resource block of at least 32 resource blocks to a wireless device regardless of wireless device buffer status report indications.

In some embodiments, the network node is configured to issue frequent periodic or aperiodic uplink grants of greater than 16 resource blocks regardless of wireless device buffer status report indications.

A further aspect of the present disclosure describes a method implemented in a network node. The method comprises: summing sequential uplink data signals at each of a plurality of antennas of the network node to produce a plurality of antenna signal sums; selecting one of the antenna signal sums to be used as a reference antenna signal sum; determining a channel impulse response for each of a plurality of other antennas based on the reference antenna signal sum and the others of the plurality of antenna signal sums; estimating a time difference of arrival from the channel impulse responses of the plurality of antennas; estimating an error of the estimated time difference of arrival of each antenna; and calculating a position of a wireless device using the estimated time differences of arrival.

Some embodiments advantageously provide methods, and network nodes for differential matched summed antenna positioning. Some embodiments introduce arrangements to make time of arrival measurements across a plurality of antennas, using all WD transmissions. This aligns with the lean carrier design philosophy of 5G/NR and does not require additional positioning specific signals.

Some embodiments optimize measurement accuracy which is a log-linear function of signal to noise ratio (SNR) and bandwidth. To maximize SNR, the proposed arrangement sums symbol-by-symbol all received WD uplink (UL) data which is then used in the time of arrival calculations. To maximize bandwidth, some embodiments operate on the full WD UL transmission while modifying network node, e.g., gNodeB, system constants to set a large minimum WD transmit bandwidth.

While WD transmitted data can be considered as a low auto-correlation signal, some embodiments eliminate false correlation peaks by using demodulation reference symbols (DM-RS) embedded in each WD transmission to define bounds on the impulse response calculated from received data signals. This is an important differentiator since it enables WD transmission data to be used by the network node, e.g., gNodeB, in calculating time of arrival, while screening out false correlations which could yield incorrect measurements.

Also, some embodiments do not use a known reference signal such as ZadoffChu sequences used in the 3GPP LTE for Primary Synchronization Signal (PSS), random access preamble (PRACH), uplink control channel (PUCCH), uplink traffic channel (PUSCH) and sounding reference signals (SRS). Instead, some embodiments use all WD transmitted data in performing this cross-correlation. An arrangement described herein uses the signal from one of the plurality of antennas as a reference.

Embodiments of a base station, communication system, and a method in a communication system are also disclosed.

BRIEF DESCRIPTION OF THE DRAWINGS

The accompanying drawing figures incorporated in and forming a part of this specification illustrate several aspects of the disclosure, and together with the description serve to explain principles of the disclosure.

DETAILED DESCRIPTION

Figure 1:
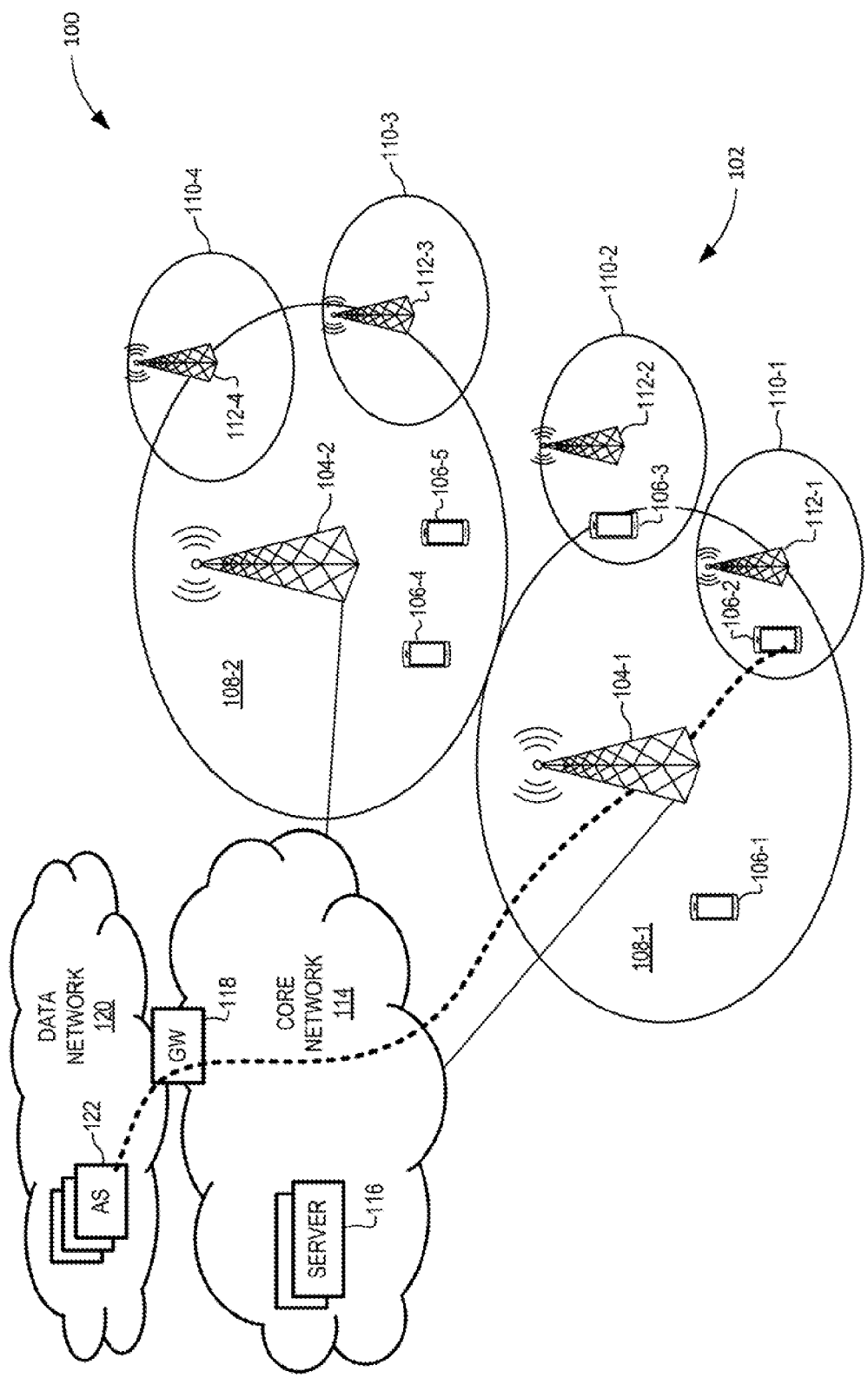
FIG. 1 is a block diagram schematically illustrating a representative network in which embodiments of the present invention may be deployed.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

At least some of the following abbreviations and terms may be used in this disclosure.
2D Two Dimensional
3GPP Third Generation Partnership Project
5G Fifth Generation Radio
AAS Antenna Array System
AoA Angle of Arrival
AoD Angle of Departure
ASIC Application Specific Integrated Circuit
BF Beamforming
BLE Bluetooth Low Energy
BLER Block Error Rate
BW Beamwidth
Cell Portion A geographical portion of a cell covered by a single antenna beam
CPU Central Processing Unit
CSI Channel State Information
dB Decibel
DCI Downlink Control Information
DFT Discrete Fourier Transform
DL Downlink
DSP Digital Signal Processor
DU Digital Unit
E911 Enhanced 911, used for mobile technology
E-CID Enhanced Cell ID
eNB Enhanced or Evolved Node B
FIR Finite Impulse Response
FPGA Field Programmable Gate Array
gNB New Radio Base Station
GPS Global Positioning System
iBeacon Apple terminology for their 802.15 BLE beacon product
ICC Information Carrying Capacity
IIR Infinite Impulse Response
KPI Key Performance Index
LBS Location Based Services
LPPa LTE Positioning Protocol A
LTE Long Term Evolution
MIMO Multiple Input Multiple Output
MME Mobility Management Entity
MMSE Minimum Mean Square Error
MTC Machine Type Communication
NR New Radio
OTT Over-the-Top PBCH Physical Broadcast Channel
PDCCH Physical Downlink Control Channel
P-GW Packet Data Network Gateway
RAM Random Access Memory
ROM Read Only Memory
RRC Radio Resource Control
RRH Remote Radio Head
RSRP Reference Signal Received Power
RSSI Received Signal Strength Indication
SCEF Service Capability Exposure Function
SINR Signal to Interference plus Noise Ratio
TBS Transmission Block Size
ToA Time-of-Arrival
UE User Equipment
UL Uplink
ULA Uniform Linear Array
URA Uniform Rectangular Array Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GVV), a Service Capability Exposure Function (SCEF), or the like.

Wireless Device: As used herein, a "wireless device" is any type of device that has access to (i.e., is served by) a cellular communications network by wirelessly transmitting (and/or receiving) signals to (and/or from) a radio access node. Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Cell: As used herein, a "cell" is a combination of radio resources (such as, for example, antenna port allocation, time and frequency) that a wireless device may use to exchange radio signals with a radio access node, which may be referred to as a host node or a serving node of the cell. However, it is important to note that beams may be used instead of cells, particularly with respect to 5G NR. As such, it should be appreciated that the techniques described herein are equally applicable to both cells and beams.

Note that references in this disclosure to various technical standards (such as 3GPP TS 38.211 V15.1.0 (2018-03) and 3GPP TS 38.214 V15.1.0 (2018 March), for example) should be understood to refer to the specific version(s) of such standard(s) that is(were) current at the time the present application was filed, and may also refer to applicable counterparts and successors of such versions.

The description herein focuses on a 3GPP cellular communications system and, as such, 3GPP terminology or terminology similar to 3GPP terminology is oftentimes used. However, the concepts disclosed herein are not limited to a 3GPP system.

FIG. 1 illustrates one example of a cellular communications network 100 in which embodiments of the present disclosure may be implemented. In the embodiments described herein, the cellular communications network 100 is a Public Land Mobility Network (PLMN) conforming to one or more of the LTE, 3G, 4G and 5G NR standards, or their successors. In the illustrated example, the cellular communications network 100 includes a (Radio) Access Network ((R)AN) 102 comprising base stations 104-1 and 104-2 controlling radio communications with wireless devices 106-1, 106-2, 106-3, 106-4, 106-5 within corresponding macro cells 108-1 and 108-2. Each macro cell 108 may be defined by any suitable combination of geography, frequency, Radio Access Technology (RAT) and modulation scheme.

Base stations 104 can be any type of network access device capable of establishing radio connection(s) with one or more wireless devices 106 within a respective coverage area of the base station 104 or low power node 112, and further configured to forward subscriber traffic between the core network 114 and the one or more wireless devices 106. An important feature of a base station 104 is that it is configured with both a radio interface configured to send and receive radio signals to and from a wireless device 106, and a network interface configured to exchange electronic and/or optical signals with the core network 114. Examples of base stations 104 and low power nodes 112 include: Evolved Node B (eNB) systems (known, for example, in the 3GPP standards): WiFi access points (known, for example from IEEE 802.11 standards) or the like. In some contexts, a base station 104 may be referred to as an access point (AP) regardless of the Radio Access Technology (RAT) that it supports.

The illustrated (R)AN 102 also includes small cells 110-1 through 110-4, within which radio communication can be controlled by corresponding low power nodes 112-1 through 112-4. As with the macro cells 108, each small cell may be defined by any suitable combination of geography, frequency, Radio Access Technology (RAT) and modulation scheme. As with the base stations 104, a low power node 112 can be any type of network access device capable of establishing radio connection(s) with one or more wireless devices 106 within a respective coverage area of the low power node 112, and further configured to forward subscriber traffic between the core network 114 and the one or more wireless devices 106. An important feature of a low power node 112 is that it is configured with both a radio interface configured to send and receive radio signals to and from a wireless device 106, and a network interface configured to exchange electronic and/or optical signals with the core network 114. In some embodiments, a low power node 112 may be connected to the core network 114 by a direct connection, such as an optical cable. In other embodiments, a low power node 112 may be connected to the core network 114 by an indirect connection, such as via a radio or optical fiber link to a base station 104. Examples of low power nodes 112 include: Remote Radio Heads (RRHs) connected to a base station or a network router (not shown): WiFi access points or the like. In some contexts, a low power node 112 may be referred to as an access point (AP) regardless of the specific Radio Access Technology (RAT) that it supports.

Notably, while not illustrated, a particular small cell 110 may alternatively be controlled by a base station 104, for example using a beam-forming technique. In such cases, the particular small cell 110 will not be associated with a respective low power node 112 per se. Rather, the particular small cell 110 will be associated with a respective set of parameters implemented in the base station 104. In this disclosure, the term "cell" is used to refer to a defined combination of parameters (such as geography, frequency, Radio Access Technology (RAT), modulation scheme, identifiers and the like) that can be used by a wireless device 106 to access communication services of the network 100. The term "cell" does not imply any particular parameter values, or any particular physical configuration of devices needed to enable a wireless device 106 to access those communication services.

Wireless devices 106 can be any type of device capable of sending and receiving radio signals to and from a base station 104 and/or low power node 112. Examples of wireless device 106 include cellular phones, Personal Data Assistants (PDAs), mobile computers, Internet of Things (IoT) devices, autonomous vehicle controllers, and the like. In some contexts, a wireless device 106 may be referred to as a User Equipment (UE) or a mobile device.

In some embodiments, the macro cells 108-1 and 108-2 may overlap each other, and may also overlap one or more small cells 110. For example, a particular macro cell 108-1 may be one macro cell 108 among a plurality of macro cells covering a common geographical region and having a common RAT and modulation scheme, but using respective different frequencies and/or AP identifiers. In such cases, a wireless device 106 located within a region covered by two or more overlapping cells 108, 112 may send and receive radio signals to and from each of the corresponding base stations 104 and/or low power nodes 112.

In the illustrated example, the (R)AN 102 is connected to a Core Network (CN) 114, which may also be referred to as Evolved Core Network (ECN) or Evolved Packet Core (EPC). The CN 114 includes (or, equivalently, is connected to) one or more servers 116 configured to provide networking services such as, for example, Network Functions (NFs) described in 3GPP TS 23.501 V15.2.0 (2018 June) "System Architecture for the 5G System" and its successors. The CN 114 also includes one or more gateway (GVV) nodes 118 configured to connect the CN 114 to a packet data network (DN) 120 such as, for example, the internet. A gateway node 118 may be referred to as a packet gateway (PGW) and/or a serving gateway (SGVV). The DN 120 may provide communications services to support end-to-end communications between wireless devices 106 and one or more application servers (as) 122 configured to exchange data packet flows with the wireless devices 106 via the CN 114 and (R)AN 102. In some contexts, an application server (AS) 122 may also be referred to as a host server.

In some contexts, an end-to-end signal path between an AS 122 and one or more wireless devices 106 may be referred to as an Over-The-Top (OTT) connection. Similarly, a communication service that employs signal transmission between an AS 122 and one or more wireless devices 106 may be referred to as an OTT service.

It should be appreciated that the separation between the CN 114 and the DN 120 can be purely logical, in order to simplify understanding of their respective roles. In particular, the CN 114 is primarily focused on providing wireless device access services and supporting wireless device mobility. On the other hand, the DN 120 is primarily focused on providing end-to-end communications, particularly across network domains. However, it will be appreciated that both the CN 114 and the DN 120 can be implemented on common physical network infrastructure, if desired.

Figure 2A:
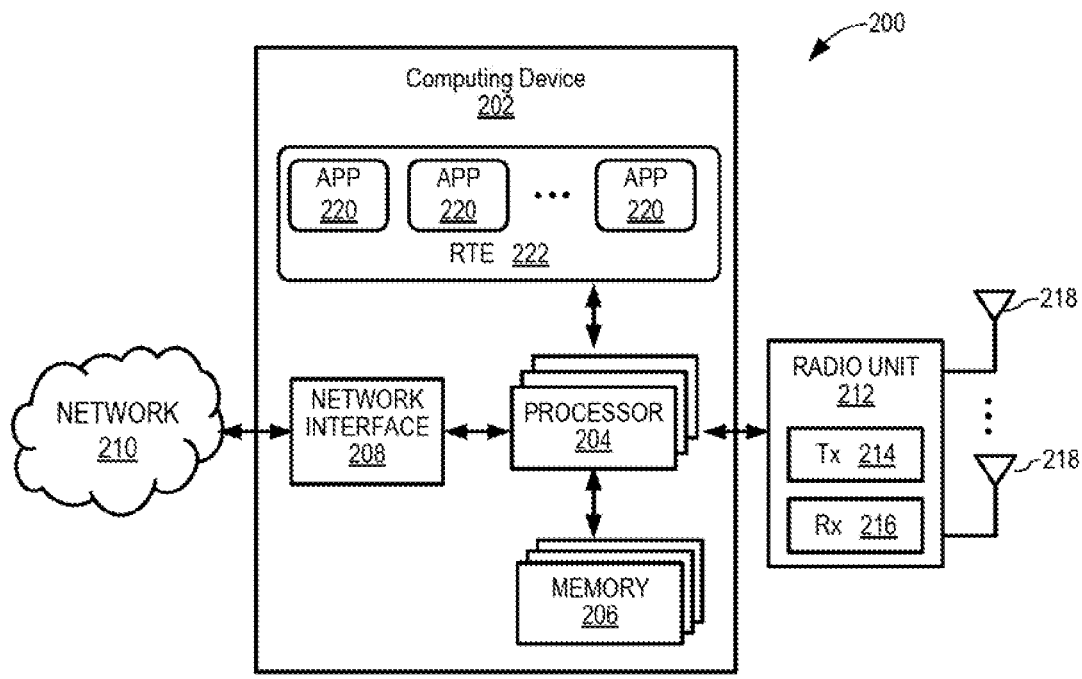
FIGS. 2A and 2B are block diagrams schematically illustrating examples of a computing device usable in embodiments of the present invention.
Figure 2B:
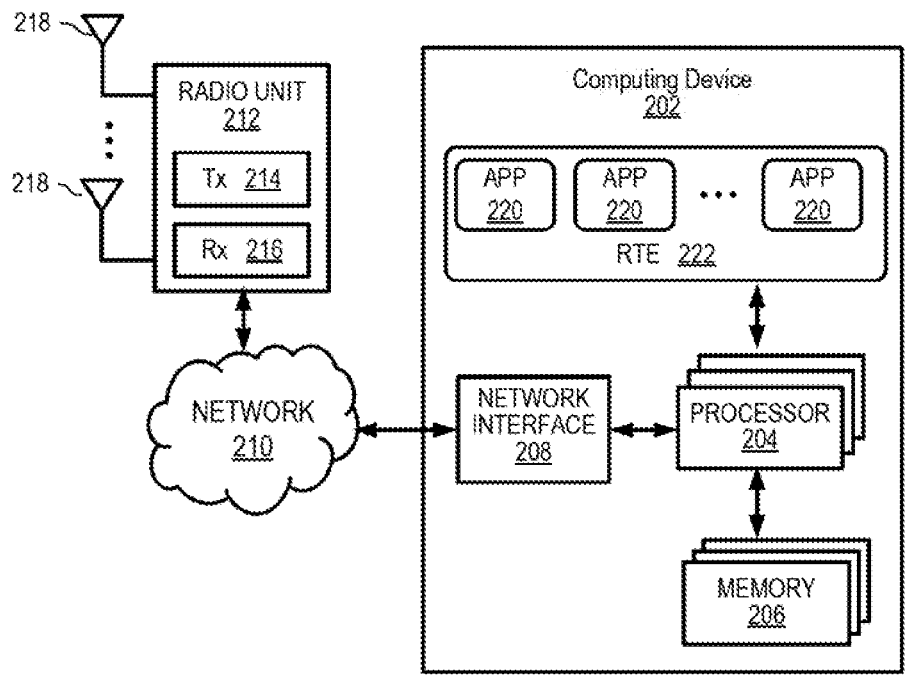

FIGS. 2A and 2B is a block diagram schematically illustrating a communications system 200 including a computing device 202 usable in embodiments of the present invention. In various embodiments, any or all of the base stations 104 or 112, wireless devices 106, core network servers 116 or gateways 118 and data network servers 122 may be implemented using systems and principles in accordance with the computing device 202. It may also be appreciated that any or all of the elements of the network 100 may be virtualized using techniques known in the art or developed in the future, in which case the functions of any or all the base stations 104 or 112, core network servers 116 or gateways 118, and/or any network functions of the core network 114 may be implemented by suitable software executing within a computing device 202 or within a data center (non shown) composed of multiple computing devices 202.

In the example of FIG. 2A, the communications system 200 generally includes computing device 202 connected to one or more networks 210 and one or more radio units 212. The computing device 202 includes one or more processors 204, a memory 206, one or more network interfaces 208. The processors 204 may be provided as any suitable combination of Central Processing Units (CPUs), Application Specific Integrated Circuits (ASICs), Field Programmable Gate Arrays (FPGAs), or the like. Similarly, the memory 206 may be provided as any suitable combination of Random Access Memory (RAM), Read Only Memory (ROM) and mass storage technologies such as magnetic or optical disc storage or the like. The network interfaces 208 enable signaling between the computing device 200 and the networks 210, such as the Core Network 114, the data network 120, or a private domain network such as a data center (not shown).

Each radio unit 212 typically includes at least one transmitter (Tx) 214 and at least one receiver (Rx) 216 coupled to one or more antennas 218. In the example of FIG. 2A, the radio unit(s) 212 is(are) shown as being external to the computing device 202 and connected to the computing device 202 via a suitable physical connection (such as a copper cable or an optical cable). In the example of FIG. 2B, the radio unit(s) 212 is(are) shown as being connected to computing device 202 via a network 210 and a network interface 208. In still other embodiments, the radio unit(s) 212 and optionally also the antenna(s) 218 may be integrated together with the computing device 202.

The one or more processors 204 operate to provide functions of the computing device 202. Typically, these function(s) are implemented as software applications (APPs) 220 or modules that are stored in the memory 206, for example, and executed by the one or more processors 204. In some embodiments, one or more software applications or modules 220 may execute within a secure run-time environment (RTE) 222 maintained by an operating system (not shown) of the computing device 202.

It may be appreciated that specific embodiments may exclude one or more of the elements illustrated in FIGS. 2A and 2B. For example, a computing device 202 configured to implement a wireless device 106 may incorporate one or more processors 204, a memory 206, and one or more radio units 212, but may exclude a network interface 208. Conversely, a computing device 202 configured to implement a server 116 or 122 may include one or more processors 204, a memory 206, and one or more network interfaces 208, but may exclude radio units 212. A computing device 202 configured to implement a base station 104 or 112, on the other hand, will normally include one or more processors 204, a memory 206, and both radio units 212 and network interfaces 208.

Figure 3:
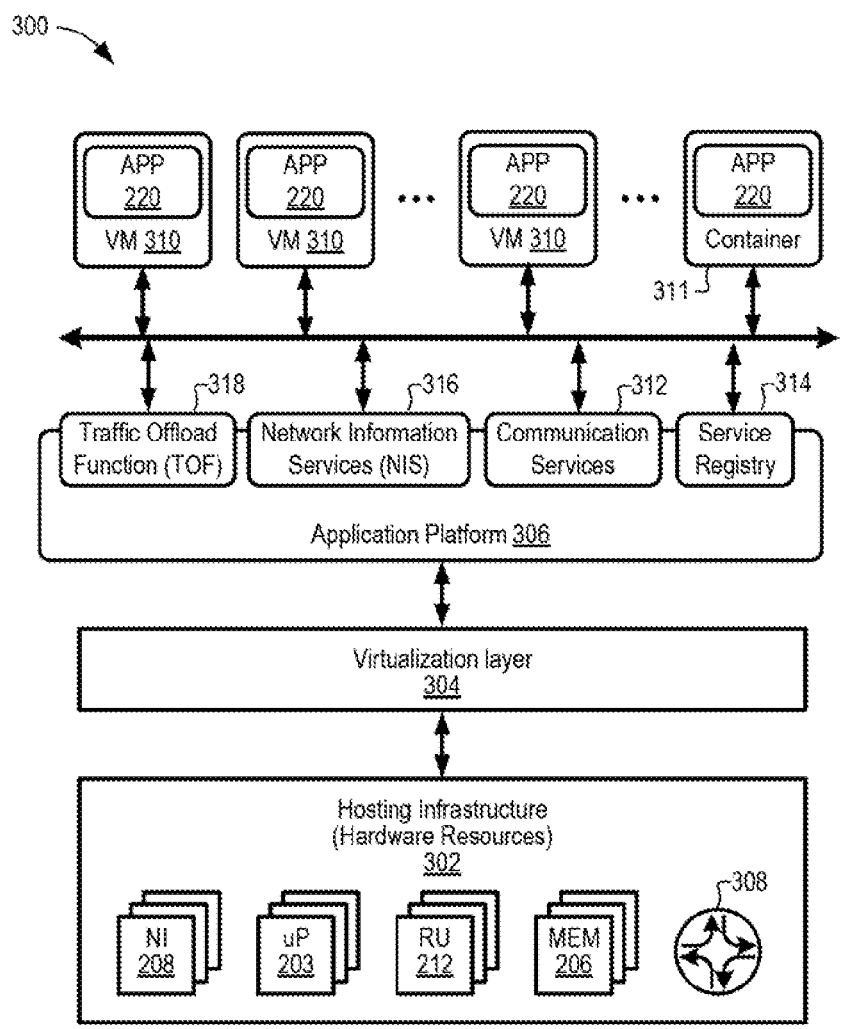
FIG. 3 is a block diagram schematically illustrating an architecture of a representative network element virtualization usable in embodiments of the present invention.

FIG. 3 is a block diagram schematically illustrating an example architecture for network element virtualization usable in embodiments of the present invention. It is contemplated that the network elements may be physically implemented using one or more computers, data storage devices and routers (any or all of which may be constructed in accordance with the system 200 described above with reference to FIG. 2) interconnected together and executing suitable software to perform its intended functions. Those of ordinary skill will recognize that there are many suitable combinations of hardware and software that may be used for this purpose, which are either known in the art or may be developed in the future. For this reason, a figure showing physical hardware components and connections is not included herein.

As may be seen in FIG. 3, the illustrated architecture 300 generally comprises hosting infrastructure 302, a virtualization layer 304 and an Application Platform Services layer 306. The hosting infrastructure 302 comprises physical hardware resources provided by the infrastructure on which the architecture 300 is being implemented. These physical hardware resources may include any or all of the processors 204, memory 206, network interfaces 208 and radio units 212 described above with reference to FIG. 2, and may also include traffic forwarding and routing hardware 308. The virtualization layer 304 presents an abstraction of the hardware resources 302 to the Application Platform Services layer 306. The specific details of this abstraction will depend on the requirements of the applications 220 being hosted by the Application Platform Services layer 306. Thus, for example, an APP 220 that provides traffic forwarding functions may be presented with an abstraction of the hardware resources 306 (e.g. processor(s) 204, memory 206 and traffic forwarding hardware 308) that simplifies the implementation of traffic forwarding policies. Similarly, an application that provides data storage functions may be presented with an abstraction of the hardware resources 306 (e.g. processor(s) 204 and memory 206) that facilitates the storage and retrieval of data (for example using Lightweight Directory Access Protocol—LDAP).

The application platform 306 provides the capabilities for hosting applications. In some embodiments, the application platform 306 supports a flexible and efficient multi-tenancy run-time and hosting environment for applications 220 by providing Infrastructure as a Service (IaaS) facilities. In operation, the application platform 306 may provide a security and resource "sandbox" for each application 220 being hosted by the platform 306. Each "sandbox" may be implemented as a Virtual Machine (VM) image 310 that may include an appropriate operating system and controlled access to (virtualized) hardware resources 302. Alternatively, each "sandbox" may be implemented as a container 311 that may include appropriate virtual memory and controlled access to host operating system and (virtualized) hardware resources 302. The application platform 306 may also provide a set of middleware application services and infrastructure services to the applications 220 hosted on the application platform 306, as will be described in greater detail below.

Applications 220 from vendors, service providers, and third-parties may be deployed and executed within a respective Virtual Machine 310. For example, PCF 220 may be implemented by means of one or more applications 220 hosted on the application platform 306 as described above.

Communication between applications 220 and services of the application platform 306 may conveniently be designed according to the principles of Service-Oriented Architecture (SOA) known in the art.

Communication services 312 may allow applications 220 to communicate with the application platform 306 (through pre-defined Application Programming Interfaces (APIs) for example) and with each other (for example through a service-specific API).

A Service registry 314 may provide visibility of the services available on a server 116 or 122. In addition, the service registry 314 may present service availability (e.g. status of the service) together with the related interfaces and versions. This may be used by applications 220 to discover and locate the end-points for the services they require, and to publish their own service end-point for other applications to use.

Network Information Services (NIS) 316 may provide applications 220 with low-level network information pertaining to a network service instance or one or more PDU sessions, for example. For example, the information provided by NIS 316 may be used by an application 220 to calculate and present relevant data (such as: cell-ID, location of the subscriber, cell load and throughput guidance) to network functions of the core network 114, any or all of which may themselves to implemented by applications 220 executing in respective VMs 310 or containers 311.

A Traffic Off-Load Function (TOF) service 318 may prioritize traffic, and route selected, policy-based, data streams to and from applications 220.

Some embodiments described below have many advantages, including maximization of measurement accuracy by using all received WD transmissions both in time and frequency domain in the network node, e.g., gNodeB, time of arrival calculation.

Traditional OTDoA algorithms requiring the WD to calculate timing information from Positioning Reference Signals can be circumvented by a WD selectively choosing to respond. Traditional OTDoA algorithms utilize optional reference signals which WDs may choose not to send. However, all WDs attached to a network will send data and demodulation reference signals (DMRS).

Some embodiments follow the 5G ultra-lean design philosophy and use only WD transmissions directly related to the delivery of data. Some embodiments leverage the low auto-correlation properties of data scrambled with the Gold-31 sequence of the DM-RS sequence to calculate the channel estimate and time of arrival. However, some embodiments use the DM-RS specifically to bound the time of arrival calculation, and optionally to contribute to the data signal power used in the time of arrival calculation.

The arrangements described herein do not require knowledge of the reference signal in calculating the channel impulse response function, used to estimate the time difference of arrival. Some embodiments select one of the antennas with a good WD RSRP signal as the reference antenna. This is particularly suited for indoor systems, where WD signal levels are often very good as seen by many of the antennas.

As compared with configurations that require advance knowledge of the reference signal, some embodiments reduce signaling communications between the 5G MAC and PHY layers by not requiring a-priori knowledge of the reference signal.

Some embodiments account for WD transmission jitter caused by timing errors which occur when the WD powers cycles clock trees between transmission bursts. Some embodiments act on a single symbol at a time, or on a plurality of symbols within a single resource block.

Some embodiments may not be circumvented by WDs which may choose to deliberately introduce timing jitter between symbols within a single resource block. These WDs may, by 3GPP standards definition, introduce up to ±4 Ts=±130 ns=±40 m of timing jitter; however, some embodiments can calculate time difference of arrival on a symbol-by-symbol basis, so that measurements are independent of timing jitter.

Some embodiments can be used on all categories of WDs including NB-IoT to standard 4G WDs capable of 20 MHz channels, to 5G WDs capable of much higher bandwidths.

Some methods can be performed in the eNodeB/gNodeB and therefore save battery life, especially for NB-IoT devices which would otherwise be required for performing calculations. Some embodiments are therefore highly efficient, thereby minimizing WD battery consumption.

In some embodiments, the base stations (gNodeB/eNodeBs) have increased accuracy over a WD based solution from high sampling rates which operate at 30.72 Mega samples per second (Msps) (=Ts) but in many instances are as high as 4×Ts (122.88 Msps) or even higher for 5G/NR systems. These higher sampling rates enable greater resolution of the channel impulse response yielding greater accuracy in the time of arrival calculations. A higher sampling rate provides greater resolution of the fastest line of sight signal. This higher sampling rate is most evident when compared to NB-IoT devices which use sampling rates of 16 Ts to 32 Ts.

In some embodiments the Time Difference of Arrival is calculated without having to subtract two different time of arrival measurements. The reference signal, which may be chosen as the signal from the antenna with the highest signal strength, provides a time of arrival of the reference signal. The correlation of this "reference" signal with the other antenna signals yields the time difference of arrival of the reference in relation to the reference antenna.

Finally, some embodiments may employ network level algorithms, and are independent of the WD. The network algorithms operate the same on all eNodeB/gNodeB platform, yielding consistency in measured results.

Systems and methods are disclosed herein that provide

Figure 4:
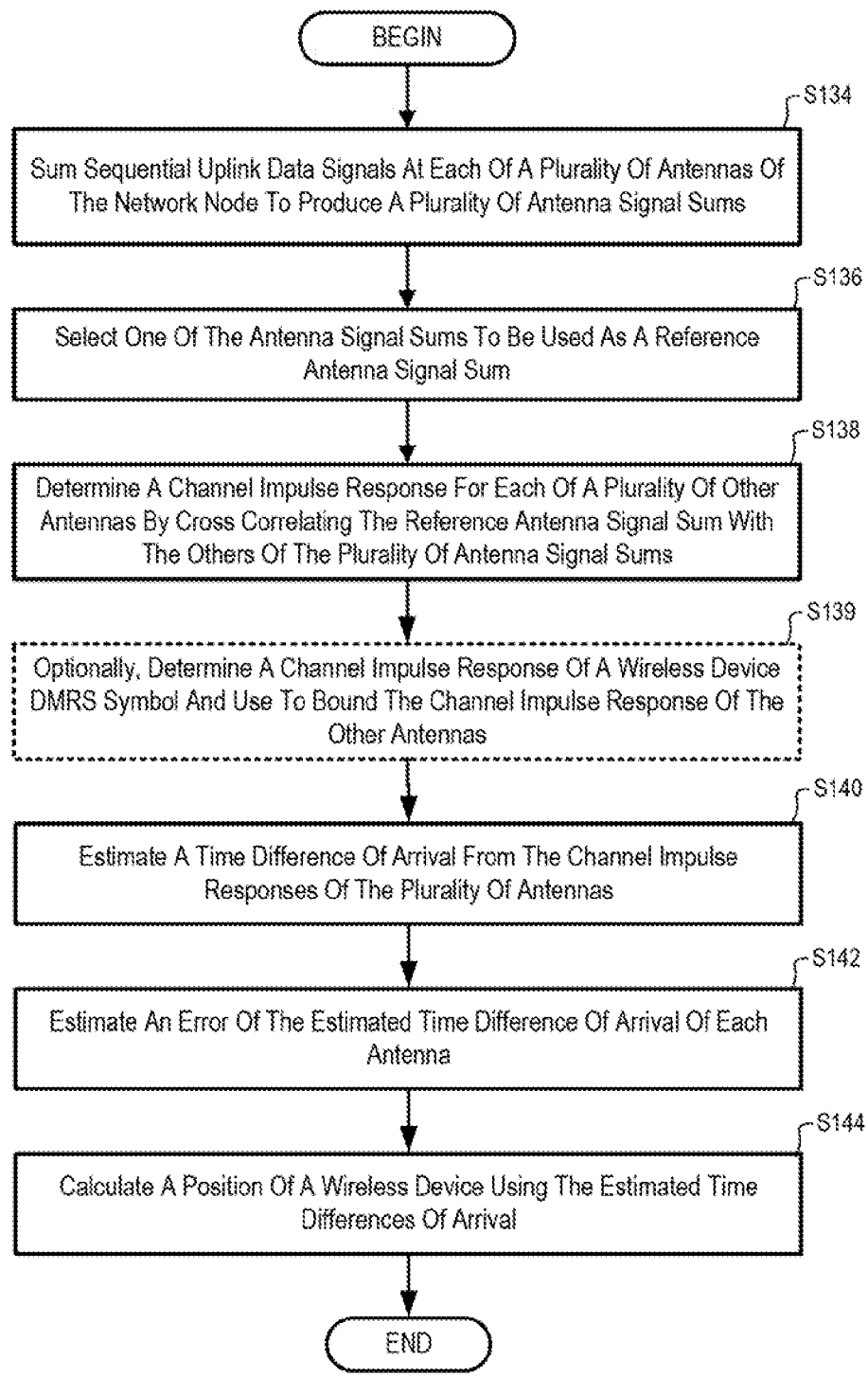
FIG. 4 is a flowchart of an example process in a network node according to some embodiments of the present disclosure.

FIG. 4 is a flowchart showing example processing in a network node 104, 112 according to some embodiments of the present disclosure. One or more Blocks described herein may be performed by one or more elements of network node 104, 112 such as by one or more processor 204, radio unit 212 and/or network interface 208. The process includes summing sequential uplink data signals at each of a plurality of antennas 218 of the network node to produce a plurality of antenna signal sums (Block S134). The process also includes selecting one of the antenna signal sums to be used as a reference antenna signal sum (Block S136). The process further includes determining a channel impulse response for each of a plurality of other antennas by cross correlating the reference antenna signal sum with the others of the plurality of antenna signal sums (Block S138). Optionally, the process also includes determining a channel impulse response of a WD DMRS symbol for use to bound the channel impulse response of the other antennas (Block S139). The process also includes estimating a time difference of arrival from the channel impulse responses of the plurality of antennas (Block S140). The process also includes estimating an error of the estimated time difference of arrival of each antenna (Block S142), and calculating a position of a wireless device using the estimated time differences of arrival (Block S144).

Figure 5:
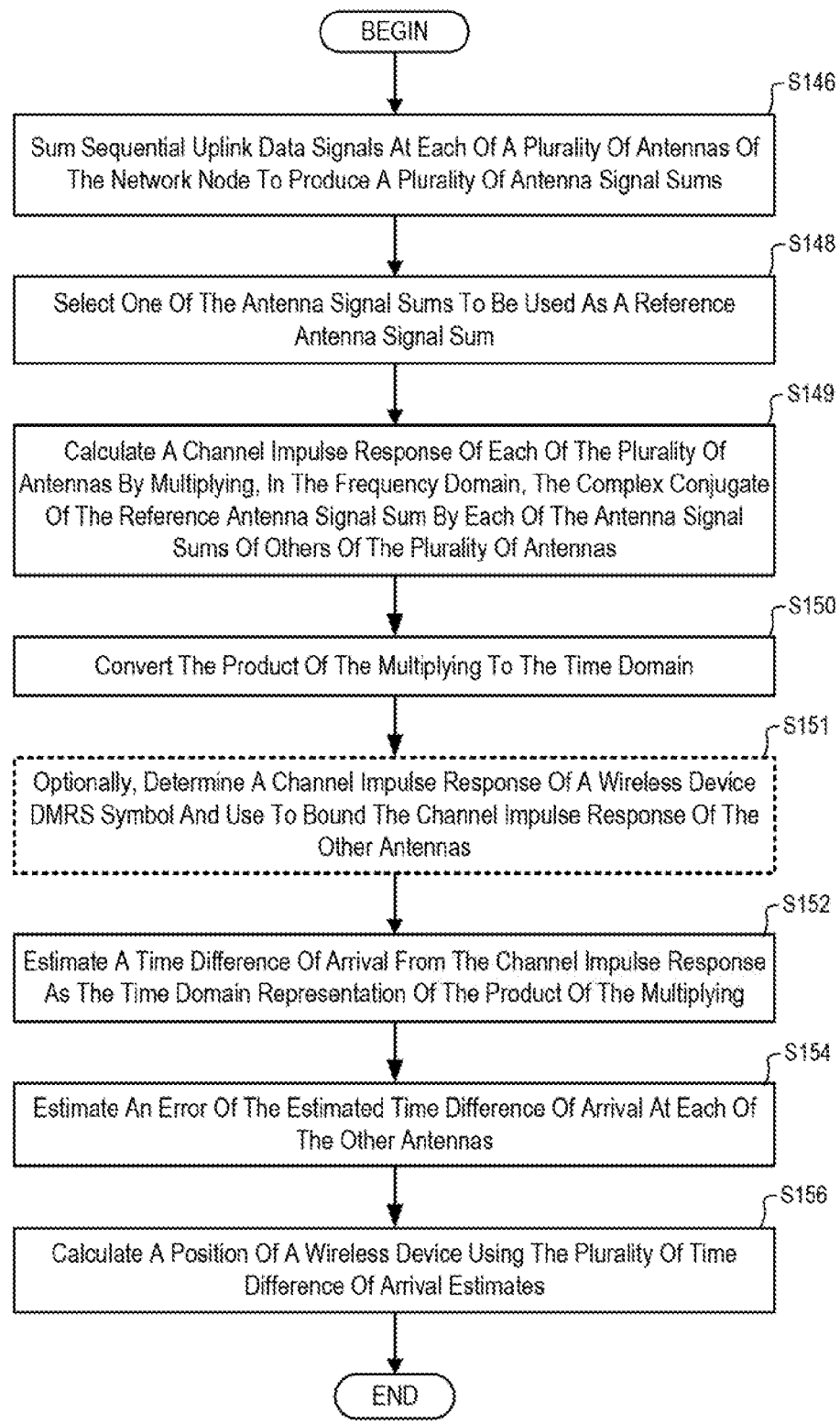
FIG. 5 is a flowchart of an alternative example process in a network node according to some embodiments of the present disclosure.

FIG. 5 is a flowchart of an alternative example process performed by a network node 104, 112 according to some embodiments of the present disclosure. One or more Blocks described herein may be performed by one or more elements of network node 104, 112 such as by one or more processor 204, radio unit 212 and/or network interface 208. The process includes summing sequential uplink data signals at each of a plurality of antennas of the network node 104, 112 to produce a plurality of antenna signal sums (Block S146). The process also includes selecting one of the antenna signal sums to be used as a reference antenna signal sum (Block S148). The process further includes calculating a channel impulse response of each of the plurality of antennas by multiplying, in the frequency domain, the complex conjugate of the reference antenna signal sum by each of the antenna signal sums of others of the plurality of antennas (Block S149). The process includes converting the product of the multiplying to the time domain (Block S150). Optionally, the process includes determining a channel impulse response of a WD DMRS and use the response to bound the channel impulse response of the other antennas (Block S151). The process also includes estimating a time difference of arrival from the channel impulse response as the time domain representation of the product of the multiplying (Block S152). The process also includes estimating an error of the estimated time difference of arrival at each of the other antennas (Block S154). Also, the process includes calculating a position of a wireless device using the plurality of time difference of arrival estimates (Block S156).

In some embodiments, the summing of sequential uplink data signals is calculated as the sum of orthogonal frequency division multiplex, OFDM, symbols received at an antenna. In some embodiments, a reference antenna is selected from the plurality of antennas as the antenna having a signal to noise ratio, SNR, of at least 10 dB, for example. In some embodiments, a plurality of channel impulse responses are calculated from a subset of symbols and summing is performed on channel impulse responses. In some embodiments, a calculated channel impulse response is bounded in a time domain by a channel impulse response of a demodulation reference signal, DMRS, symbol from at least one of the plurality of antenna signals. In some embodiments, a time-based linear quadratic estimation algorithm is employed to minimize statistical noise on the time difference of arrival calculations. In some embodiments, a channel impulse response is calculated as a plurality of antenna signal sums of reference symbols cross correlated with a reference antenna sum of reference symbols. In some embodiments, the estimation of time differences of arrival are based on knowledge that orthogonal frequency division multiplex, OFDM, symbol timing is free of jitter. In some embodiments, the antenna signal sums are integrated over a duration of one of 50 ms, 500 ms and 5000 ms.

In some embodiments, the network node is further configured to use Uplink Resource Allocation Type 0 to have a minimum uplink grant window size of 16 resource blocks, for example, and is further configured to grant at least two uplink grant windows to a wireless device to ensure that an uplink signal bandwidth is at least 32 resource blocks wide, for example, regardless of wireless device buffer status report indications.

In some embodiments, the network node is further configured to use Uplink Resource Allocation Type 1, with no minimum uplink grant window size and is further configured to grant a virtual resource block of at least 32 resource blocks, for example, to a wireless device regardless of wireless device buffer status report indications. In some embodiments, the network node is further configured to issue frequent periodic or aperiodic uplink grants of greater than 16 resource blocks, for example, regardless of wireless device buffer status report indications.

Having described the general process flow of arrangements of the disclosure and having provided examples of hardware and software arrangements for implementing the processes and functions of the disclosure, the sections below provide details and examples of arrangements for differential matched summed antenna positioning.

Some embodiments rely on the time domain orthogonality of UE 106 uplink orthogonal frequency division multiplex (OFDM) signals in lieu of a reference signal, such as a 3GPP position reference signal, to accurately measure uplink time difference of arrival (UTDoA) and extract channel characteristics of multipath delay.

OFDM signals are created from digital data that is mapped onto N-parallel subcarriers, and then converted into time domain using an Inverse Fast Fourier Transform (IFFT) into an OFDM symbol $O_k$.

$$O_k = \sum_{n=0}^{N-1} d_n e^{\frac{j2\pi kn}{N}}$$

In the equation above, d, is the data symbol on the n-th sub-carrier and $O_k$ is the N-point inverse fast Fourier transform (I-FFT) of the signal. OFDM subcarrier frequencies are orthogonal, where the average value over time T of the multiplication of two signals is zero.

$$\frac{1}{T}\int_0^T x(t)y(t)dt = 0$$

This property ensures that the time domain symbol is uncorrelated over the duration T enabling received OFDM signals to be used as an alternate to reference signals.

Figure 6:
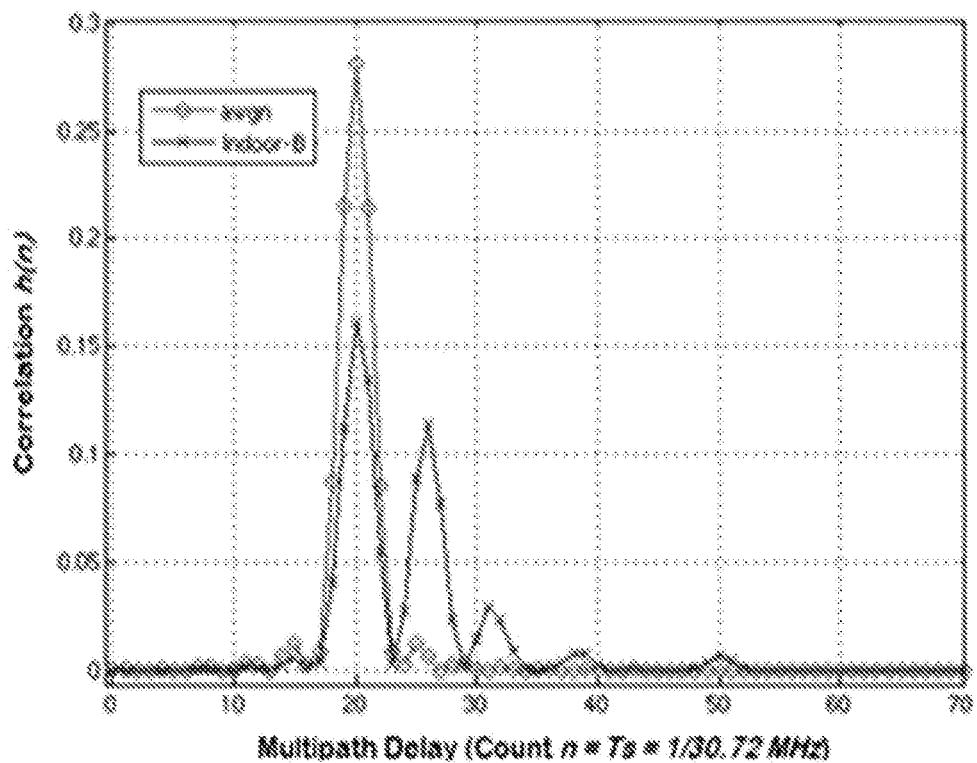
FIG. 6 is a graph of a channel impulse response function.

Positioning reference signals r(n) are known in advance of their transmission and therefore can be used to calculate the time difference of arrival of all WD signals u(n). Calculation may be performed by correlating the known PRS against each received signal, with the output yielding the channel impulse response function h(n) shown in FIG. 6 for an International Telecommunication Union (ITU) Recommendation (REC) M.1225 Indoor-6 multipath channel model.

$$h(n) = \sum_{m=0}^{m=N} r(m)u(n-m)$$

The calculation may be performed as a multiplication of the complex conjugate of the reference signal in the frequency domain R*(n) with the FFT of the received WD signals U(n), and converted back to time domain.

$$H(n)=R^*(n)U(n)$$

$$h(n)=\text{IFFT}(H(n))$$

In the indoor case, WD UL transmissions are generally designed to have good reference signal received power (RSRP) with SNR >20 dB at one or more antennas in the venue. Simulations show valid results using data signals as reference signals to measure the channel impulse response function h(n) under conditions of high SNR for the reference signal, and for the received signals at various SNR levels.

These simulations use additive white Gaussian noise (AWGN) channel with: no delay; 2048 FFT size, 15 kHz tone spacings, normal LTE cyclic prefix (CP), and random quadrature phase shift keyed (QPSK) modulation on all allocated subcarriers. NB-IoT signals use π/4 QPSK for single subcarrier which is a phase shift of π/4 every OFDM symbol.

Figure 7A:
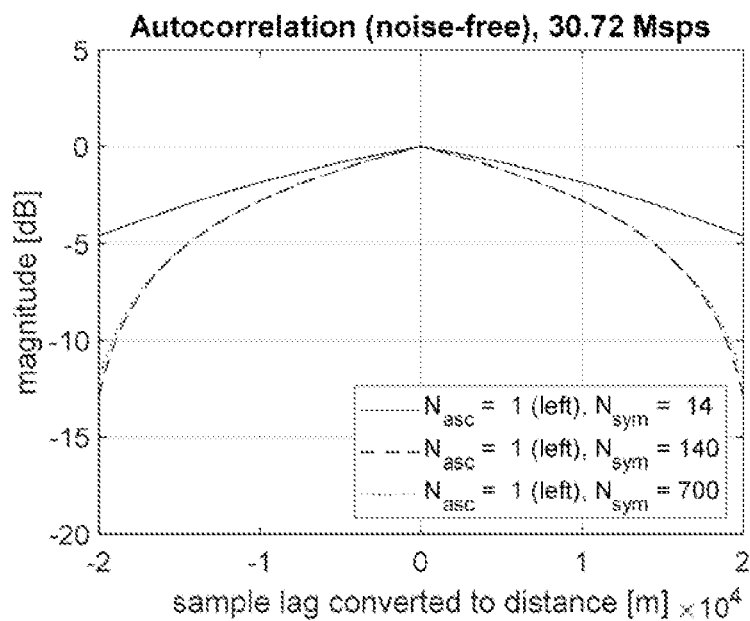
FIGS. 7A and 7B show a comparison of autocorrelation and cross correlation for N OFDM symbols and Nasc=1.
Figure 7B:
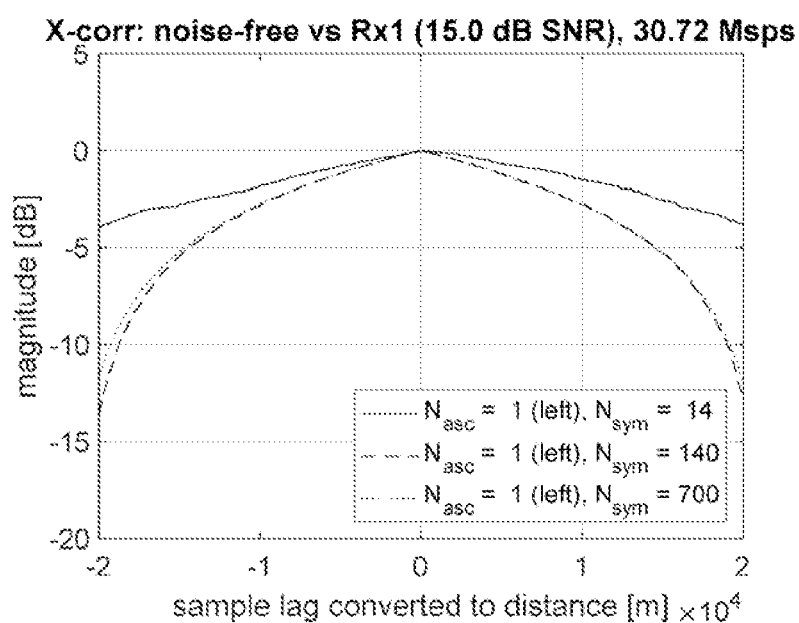

Single Carrier NB-IoT Simulations:

Simulations of a Single Carrier NB-IoT network show that the NB-IoT data signal received from a UE 106 can only be used as a reference signal for purposes of determining the channel impulse model when the reference is noise free. For indoor deployments, the reference is considered noise free since the pZeroThreshold (−80 dBm/RB) is set well above (>>50 dB) the thermal noise floor of −132 dBm/15 kHz, and even for outdoor network node 104, 112, e.g., eNodeB/gNodeB, radios, the pZeroThreshold is set to −103 dBm/RB, yielding a noise free reference signal. In the plots of FIG. 7, the top graph (FIG. 7A) shows both Reference and Rx1 being "noise free" and the bottom graph (FIG. 7B) shows Rx1 with SNR=15.0 dB.

Simulations of a NB-IoT Single Subcarrier, such as from a UE 106, conducted over uplink (UL) transmission durations of 500 µs to 50 ms where the number of OFDM symbols Nsym ranges from 50×14 (50 ms) to 500×14 (500 ms) to 5000×14 (5 s) show very good channel impulse responses which can be used to estimate the TDoA. Of these comparisons, 500 ms NB-IoT Single Carrier UL transmissions from a UE 106 represent a data transmission of 1750-bytes, just slightly longer than a typical 1500-byte Internet protocol (IP) packet commonly transmitted in the Internet. The simulation case of 5 s represents the aggregation of 10 such packet transmissions.

Figure 8A:
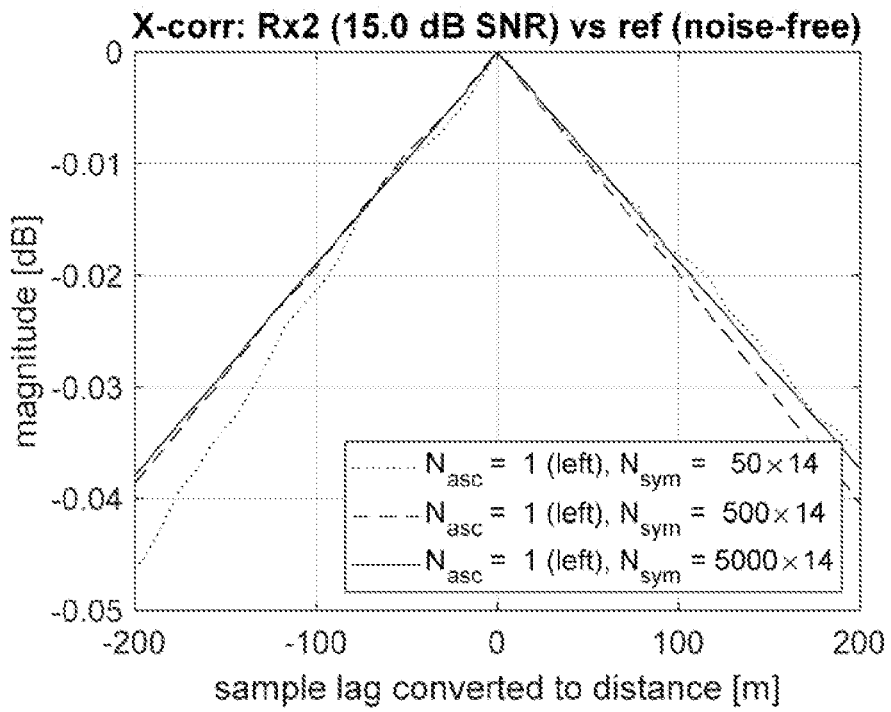
FIGS. 8A and 8B illustrate cross correlation versus lag converted to distance for a noise free reference signal, a SNR of 15 dB and Nasc=1, where Nasc is the number of active subcarriers.
Figure 8B:
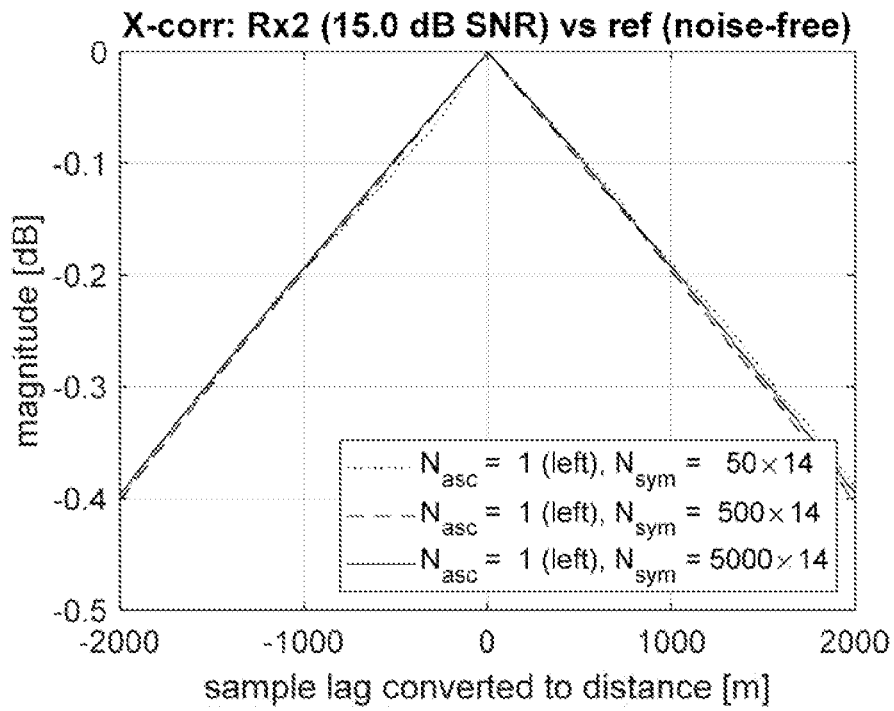

The SNR above for the comparative antenna Rx2 is shown in FIGS. 8A and 8B as 15 dB, which is well below the WD UL Single Carrier NB-IoT transmissions, such as from a NB-IoT UE 106, that are received by the network node 104, 112. This SNR represents a signal level 15 dB above the thermal noise floor at −132 dBm. In general, the network node 104, 112 will use power control to set the Single Carrier NB-IoT to be −103 dBm for a microcell or −80 dBm for indoor deployments.

These simulations show that a Single Carrier NB-IoT signal from a UE 106 can be correlated against nearby antennas such as antennas 63 of other nearby network nodes 16, with received signal levels which are at least 14 dB below the signal received at the host network node serving the UE 106.

Single PRB NB-IoT Simulations:

These NB-IoT devices, i.e., UEs 106, have a bandwidth of one PRB or 180 kHz and are commonly deployed NB-IoT devices.

Figure 9A:
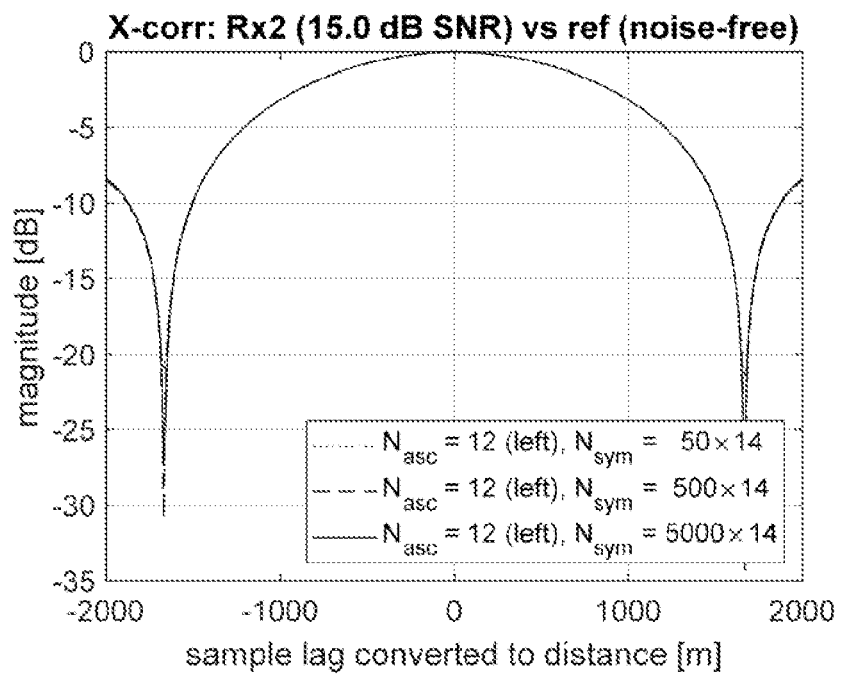
FIGS. 9A and 9B illustrate cross correlation versus lag converted to distance for a noise free reference signal, a SNR of 15 dB and Nasc=12.
Figure 9B:
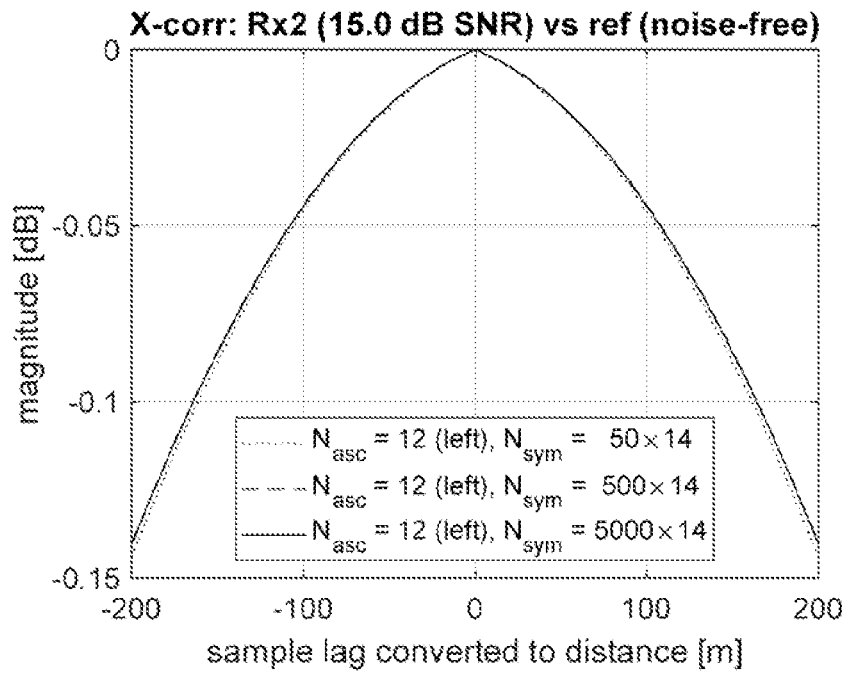

Single PRB NB-IoT noise free (SNR >>25 dB) data signals from a UE 106 can be used as reference signals to calculate channel impulse responses. Simulations, as shown in FIGS. 9A and 9B, show very good cross correlation of the noise free signal against a +15 dB Rx2 signal received from a different antenna.

Cat M1 (6 PRB) NB-IoT Simulations:

The bandwidth of these NB-IoT devices is six physical resource blocks (PRBs) or 1080 kHz and are quite commonly deployed.

Figure 10A:
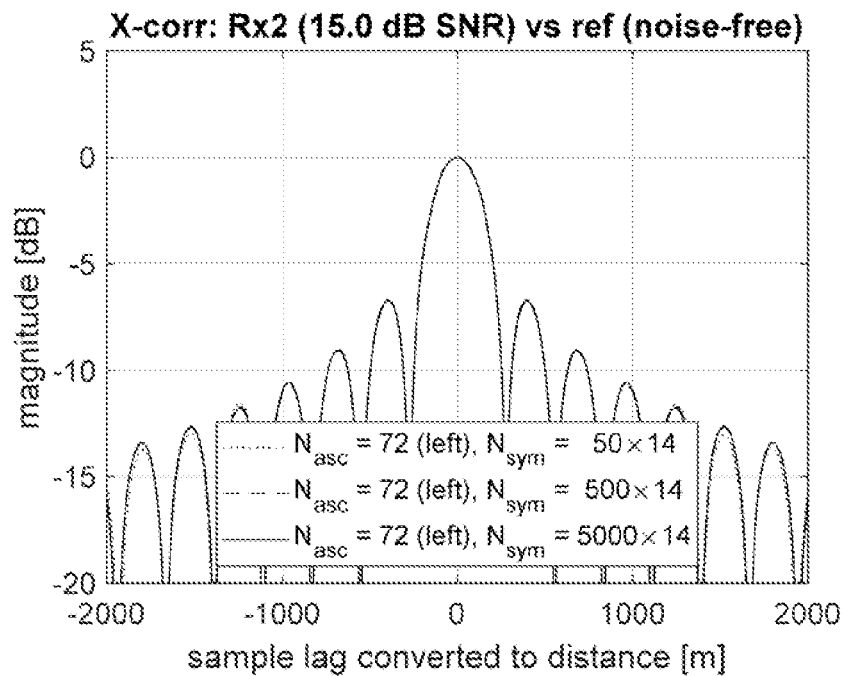
FIGS. 10A and 10B illustrate cross correlation versus lag converted to distance for a noise free reference signal, a SNR of 15 dB and Nasc=72.
Figure 10B:
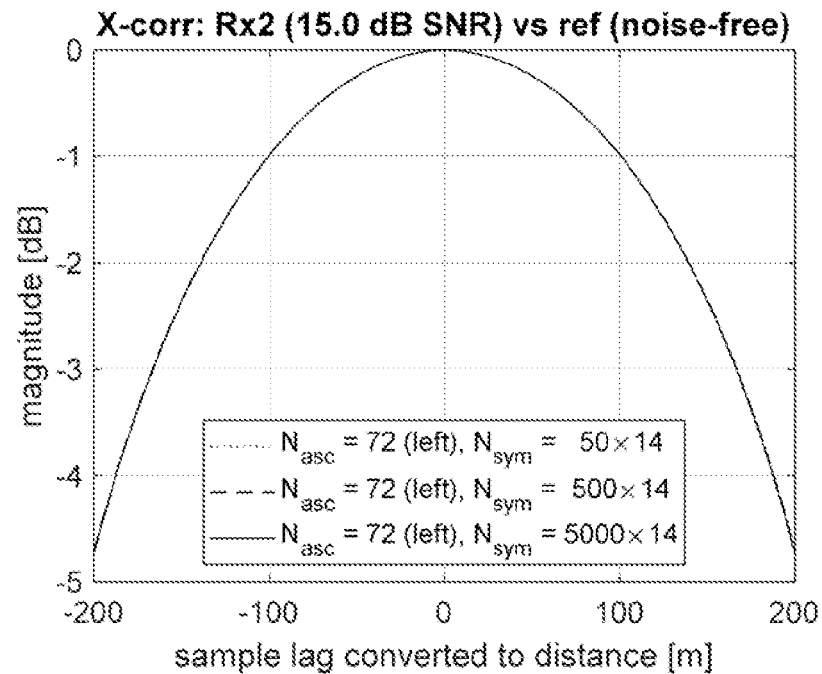
Figure 13:
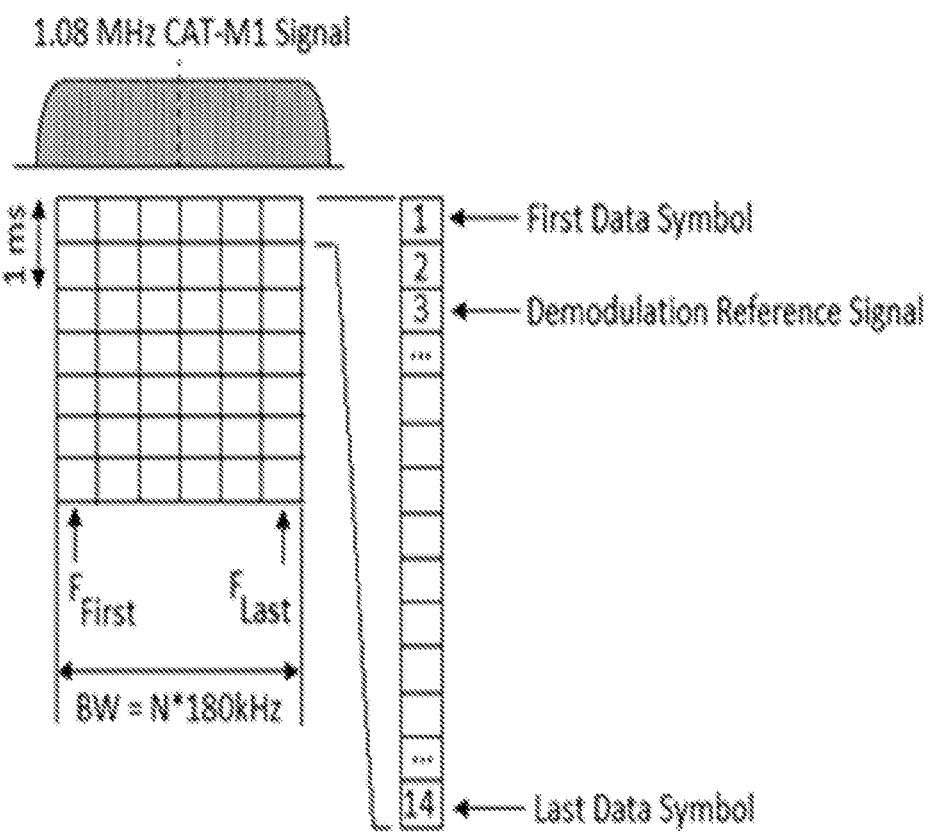
FIG. 13 is time-frequency illustration of data symbols and location of a reference symbol.

Simulations of Cat M1 NB-IoT using a "noise free" reference data signal, as shown in FIGS. 10A and 10B, show that the cross-correlation is quite discernable, and useable as a means to estimate the channel model. FIG. 13 shows that result when the eNodeB/gNodeB receives CAT M1 signals at −95 dBm with a −114 dBm thermal noise floor for a 19 dB SNR (outdoors) and 39 dB (indoor deployments). Indoor deployments can treat CAT M1 signals as "noise free" with an SNR of 39 dB on at least one antenna.

LTE (50 PRB) Simulations:

This simulation represents using the data from a 10 MHz LTE channel as the reference signal when performing cross-correlations against another antenna (Rx1).

Figure 11A:
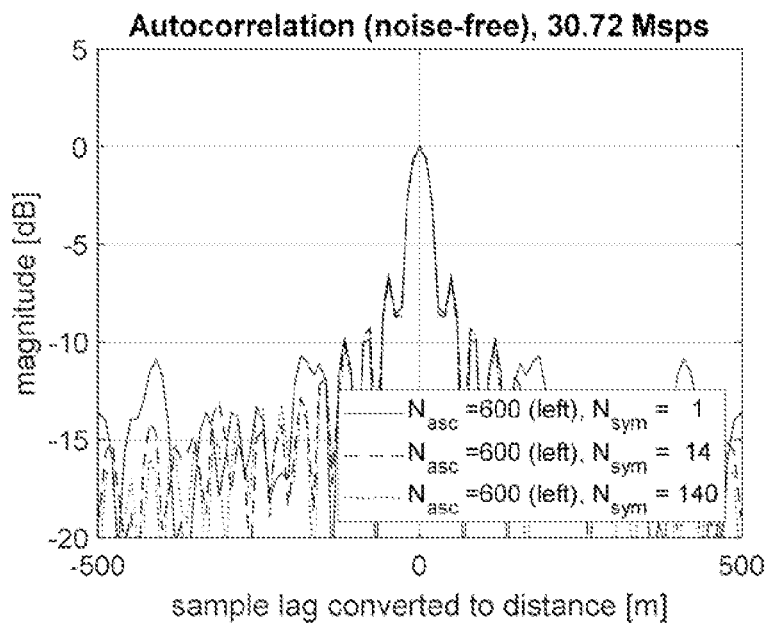
FIGS. 11A and 11B illustrate cross correlation versus lag converted to distance for a noise free reference signal, a SNR of 15 dB and Nasc=600.
Figure 11B:
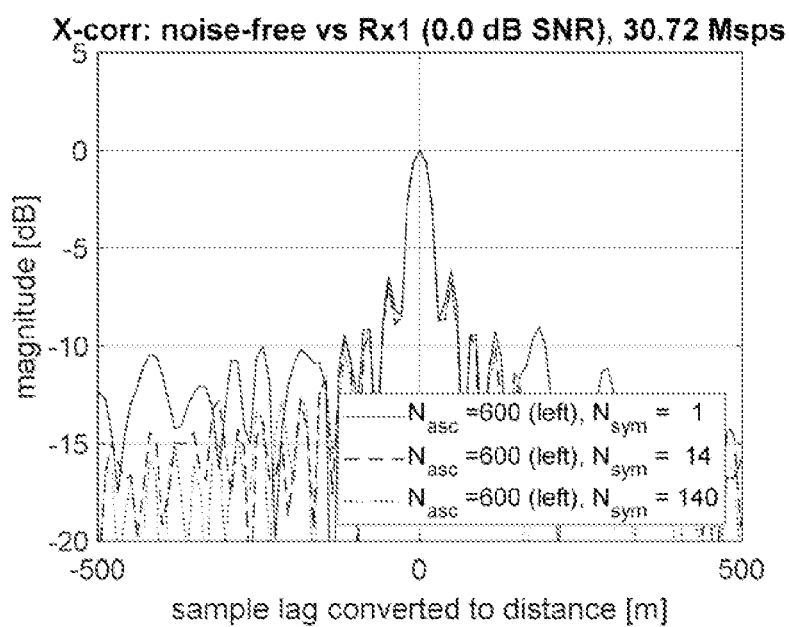

Simulations with a "noise free" reference signal, as shown in FIGS. 11A and 11B, show good cross correlation performance even to very low 0 dB SNR for a second signal at antenna Rx1. In this case, the cross-correlation is good even for single symbols, with a SNR as high as 0 dB.

In summary, these simulations demonstrate at least the following:

Data signals with high SNR can be used as the reference signal when cross correlation is used to estimate the channel impulse response;

This methodology can be used for all 4G/5G OFDM signals including Single Carrier NB-IoT, Single PRB NB IoT, CAT M1 NB-IoT, and LTE. Longer integration windows may be needed for narrower band signals, and short single symbols correlations can be used with wider band CAT M1 and LTE signals; and This methodology provides good margin, allowing positioning to be performed on a set of antennas 63 which are located near the intended UE 106 but may see WD signal levels 15 dB below the host network node 104, 112, e.g., eNodeB or gNodeB.

Although the data correlations appear to be well defined with most of the cross-correlation power contained in the "impulse" response, some spurious correlation power exists. In FIGS. 11A and 11B, that power is 10 dB below the main correlation peak. Some embodiments provide the option to use the autocorrelation of the DM-RS signals to limit the correlation bounds, and in doing so, mitigate the effects of spurious correlations.

Figure 12:
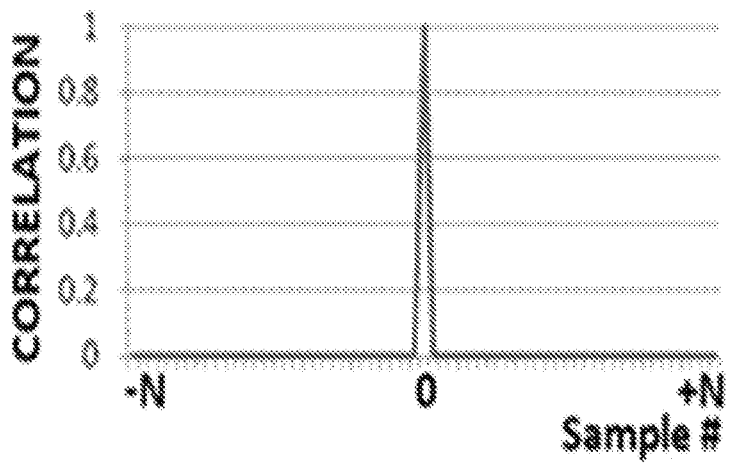
FIG. 12 is a graph of auto correlation of a Zadoff-Chu sequence.

As shown in FIG. 12, a Zadoff-Chu sequence has zero auto correlation with itself except at an offset of 0, and does not exhibit spurious correlations. For this reason, these sequences, used in the demodulation reference signal, can be used to estimate and bound the channel impulse response without concern of false or spurious correlations.

Moreover, the cross-correlation between two prime length Zadoff-Chu sequences, i.e., different values of u, is a constant $1/\sqrt{N_{ZC}}$, provided that u1-u2 is relatively prime to $N_{ZC}$.

Some embodiments will allow for automatic configuration of time and frequency integration (summation) components.

If the desired signal is a CAT-M1, then the antenna signal summing will be integrated over the frequency span of FFirst to FLast where the covered bandwidth is 6 RBs or 1.08 MHz. In time, this signal would be integrated over the data window signal which would be defined from a "First Data Symbol" to a "Last Data Symbol" as shown in FIG. 16.

FIG. 13 shows an example of one or more reference symbol locations, to be used to limit the correlation window of the received WD data signal. Next generation 5G systems include many possible reference signals throughout the Resource Block to address issues such as Doppler. Signals can be configurable and used to approximate the channel impulse correlation window size with details of frequency and time.

Figure 14:
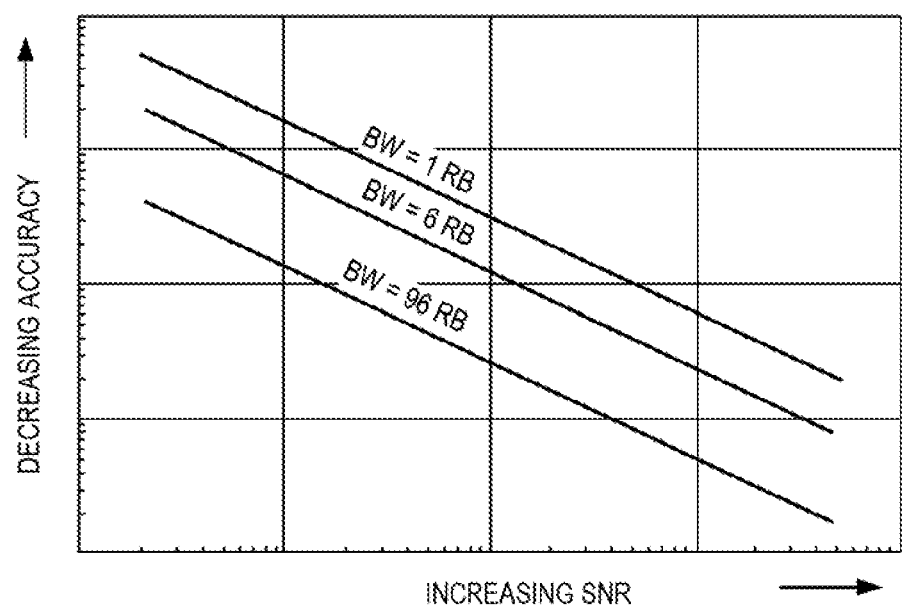
FIG. 14 is a graph of accuracy of positioning verses SNR.

While reference signals are useful for setting bounds on correlation windows, they represent only a small portion of the UL received signal power and are therefore limited in their ability to be used for high resolution positioning. As described previously, positioning accuracy as a function of SMR is a log-linear relationship, where higher SNR through the integration of all WD data achieves the highest positioning accuracy, as shown in FIG. 14. Increasing signal bandwidth also increases positioning accuracy. Combination data signal processing with correlation window determination achieves the highest SNR, while eliminating correlations issues resulting from the use of data.

Features of some embodiments may be summarized as follows. In a multiple antenna system, at each antenna 218, data may be summed from one or more contiguous UE 106 uplink symbols to create a data signal. One of the antennas 63 with good RSRP data signal levels may be selected as a reference signal. A cross-correlation of the reference antenna signal with one or more signals of other antennas 63 may then be calculated. Optionally, a cross correlation of the DMRS signal from at least one of the antennas 63 may be calculated to limit false correlations of each antenna's data signals. A processor of the base station, i.e., network node 104, 112, calculates a time difference of arrival (TDoA) and a signal to noise ratio (SNR) from each antenna's cross-correlated data signal. Optionally the processor 204 calculates a reference signal received power (RSRP) for each antenna's cross-correlated data signal. The processor 204 performs trilateral calculations from the TDoA, SNR and antenna positional measurements. Optionally, the processor 204 employs a time-based linear quadratic estimation algorithm to incorporate aperiodic measurement data calculated from a WD's normal data transmissions, while being able to minimize measurement noise.

While processes in the figures may show a particular order of operations performed by certain embodiments of the present disclosure, it should be understood that such order is representative, and that alternative embodiments may perform the operations in a different order, combine certain operations, overlap certain operations, etc.

Those skilled in the art will recognize improvements and modifications to the embodiments of the present disclosure. All such improvements and modifications are considered within the scope of the concepts disclosed herein.

What is claimed is:

1. A network node configured to communicate with a wireless device (WD), the network node comprising:
   at least one processor; and
   a memory including computer readable software instructions configured to control the at least one processor to implement steps of:
      summing sequential uplink data signals at each of a plurality of antennas of the network node to produce a plurality of antenna signal sums;
      selecting one of the antenna signal sums to be used as a reference antenna signal sum;
      determining a channel impulse response for each of a plurality of other antennas based on the reference antenna signal sum and the others of the plurality of antenna signal sums;
      estimating a time difference of arrival from the channel impulse responses of the plurality of antennas;
      estimating an error of the estimated time difference of arrival of each antenna; and calculating a position of a wireless device using the estimated time differences of arrival.

2. The network node as claimed in claim 1, wherein determining the channel impulse response for each of the plurality of other antennas comprises cross correlating the reference antenna signal sum with the others of the plurality of antenna signal sums, and wherein from the channel impulse responses of the plurality of antennas.

3. The network node as claimed in claim 1, wherein determining the channel impulse response for each of the plurality of other antennas comprises multiplying, in the frequency domain, the complex conjugate of the reference antenna signal sum by each of the antenna signal sums of others of the plurality of antennas, and wherein the time difference of arrival is estimated as the time domain representation of the product of the multiplying.

4. The network node as claimed in claim 1, wherein the summing of sequential uplink data signals is calculated as the sum of orthogonal frequency division multiplex, OFDM, symbols received at an antenna.

5. The network node as claimed in claim 1, wherein a reference antenna is selected from the plurality of antennas as the antenna having a signal to noise ratio, SNR, of at least 10 dB.

6. The network node as claimed in claim 1, wherein a plurality of channel impulse responses are calculated from a subset of symbols and summing is performed on channel impulse responses.

7. The network node as claimed in claim 6, wherein the calculated channel impulse response is bounded in a time domain by a channel impulse response of a demodulation reference signal, DMRS, symbol from at least one of the plurality of antenna signals.

8. The network node as claimed in claim 6, wherein the channel impulse response is calculated as a plurality of antenna signal sums of reference symbols cross correlated with a reference antenna sum of reference symbols.

9. The network node as claimed in claim 1, wherein a time-based linear quadratic estimation algorithm is employed to minimize statistical noise on the time difference of arrival calculations.

10. The network node as claimed in claim 1, wherein the estimation of time differences of arrival are based on knowledge that orthogonal frequency division multiplex, OFDM, symbol timing is free of jitter.

11. The network node as claimed in claim 1, wherein the antenna signal sums are integrated over a duration of one of 50 ms, 500 ms and 5000 ms.

12. The network node as claimed in claim 1, wherein the network node is configured to use Uplink Resource Allocation Type 0 to have a minimum uplink grant window size of 16 resource blocks and is configured to grant at least two uplink grant windows to a wireless device to ensure that an uplink signal bandwidth is at least 32 resource blocks wide regardless of wireless device buffer status report indications.

13. The network node as claimed in claim 1, wherein the network node is configured to use Uplink Resource Allocation Type 1, with no minimum uplink grant window size and is configured to grant a virtual resource block of at least 32 resource blocks to a wireless device regardless of wireless device buffer status report indications.

14. The network node as claimed in claim 1, wherein the network node is configured to issue frequent periodic or aperiodic uplink grants of greater than 16 resource blocks regardless of wireless device buffer status report indications.

15. A method implemented in a network node, the method comprising:
summing sequential uplink data signals at each of a plurality of antennas of the network node to produce a plurality of antenna signal sums;
selecting one of the antenna signal sums to be used as a reference antenna signal sum;
determining a channel impulse response for each of a plurality of other antennas based on the reference antenna signal sum and the others of the plurality of antenna signal sums;
estimating a time difference of arrival from the channel impulse responses of the plurality of antennas;
estimating an error of the estimated time difference of arrival of each antenna; and
calculating a position of a wireless device using the estimated time differences of arrival.

16. The method of claim 15, wherein determining the channel impulse response for each of the plurality of other antennas comprises cross correlating the reference antenna signal sum with the others of the plurality of antenna signal sums, and wherein from the channel impulse responses of the plurality of antennas.

17. The method of claim 15, wherein determining the channel impulse response for each of the plurality of other antennas comprises multiplying, in the frequency domain, the complex conjugate of the reference antenna signal sum by each of the antenna signal sums of others of the plurality of antennas, and wherein the time difference of arrival is estimated as the time domain representation of the product of the multiplying.

18. The method as claimed in claim 15, wherein the summing of sequential uplink data signals is calculated as the sum of orthogonal frequency division multiplex, OFDM, symbols received at an antenna.

19. The method as claimed in claim 15, wherein a reference antenna is selected from the plurality of antennas as the antenna having a signal to noise ratio, SNR, of at least 10 dB.

20. The method as claimed in claim 15, wherein a plurality of channel impulse responses are calculated from a subset of symbols and summing is performed on channel impulse responses.

21. The method as claimed in claim 20, wherein the calculated channel impulse response is bounded in a time domain by a channel impulse response of a demodulation reference signal, DMRS, symbol from at least one of the plurality of antenna signals.

22. The method as claimed in claim 20, wherein a channel impulse response is calculated as a plurality of antenna signal sums of reference symbols cross correlated with a reference antenna sum of reference symbols.

23. The method as claimed in claim 15, wherein a time-based linear quadratic estimation algorithm is employed to minimize statistical noise on the time difference of arrival calculations.

24. The method as claimed in claim 15, wherein the estimation of time differences of arrival are based on knowledge that orthogonal frequency division multiplex, OFDM, symbol timing is free of jitter.

25. The as claimed in claim 15, wherein the antenna signal sums are integrated over a duration of one of 50 ms, 500 ms and 5000 ms.

26. The method as claimed in claim 15, further comprising configuring the network node to use Uplink Resource Allocation Type 0 to have a minimum uplink grant window size of 16 resource blocks and configuring the network node to grant at least two uplink grant windows to a wireless device to ensure that an uplink signal bandwidth is at least 32 resource blocks wide regardless of wireless device buffer status report indications.

27. The method as claimed in claim 15, further comprising configuring the network node to use Uplink Resource Allocation Type 1, with no minimum uplink grant window size and configuring the network node to grant a virtual resource block of at least 32 resource blocks to a wireless device regardless of wireless device buffer status report indications.

28. The method as claimed in claim 15, further comprising configuring the network node to issue frequent periodic or aperiodic uplink grants of greater than 16 resource blocks regardless of wireless device buffer status report indications.

* * * * *